June 2, 1964  H. J. McLEAN  3,135,224
TRACTION MOTOR SUSPENSION

Filed Dec. 8, 1960  4 Sheets-Sheet 3

INVENTOR.
HOWARD J. McLEAN
BY Robert H. Montgomery
ATTORNEY

June 2, 1964  H. J. McLEAN  3,135,224
TRACTION MOTOR SUSPENSION
Filed Dec. 8, 1960  4 Sheets—Sheet 4
FIG. 5
(PRIOR ART)
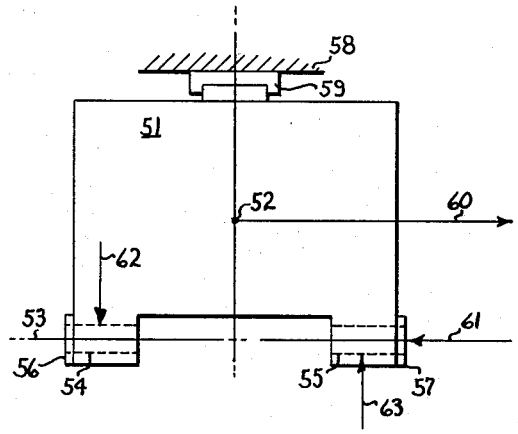
FIG. 5ª
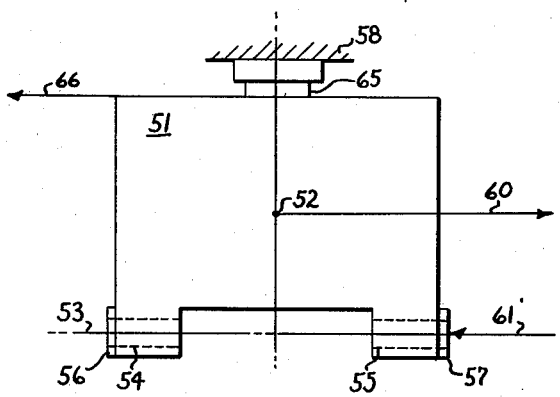
FIG. 5ᵇ
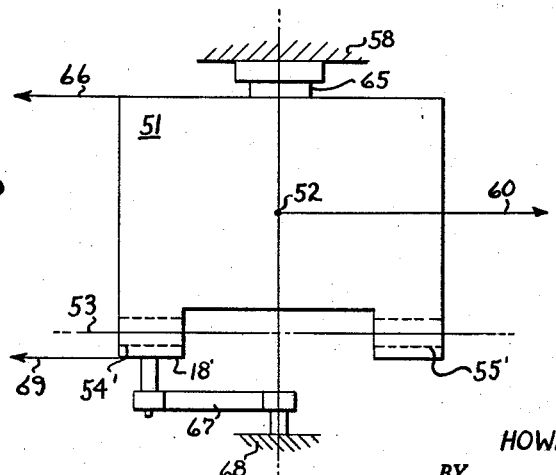
INVENTOR.
HOWARD J. McLEAN
BY Robert H Montgomery
ATTORNEY

United States Patent Office 3,135,224
Patented June 2, 1964

3,135,224
TRACTION MOTOR SUSPENSION
Howard J. McLean, Erie, Pa., assignor to General Electric Company, a corporation of New York
Filed Dec. 8, 1960, Ser. No. 74,581
2 Claims. (Cl. 105—136)

This invention relates to a new and improved traction motor suspension arrangement and has among its objects the provision of a new and improved traction motor nose suspension arrangement having no relatively movable engaging metal parts; an improved traction motor suspension arrangement which may be readily incorporated on new or existing motorized trucks; a traction motor nose suspension which is extremely simple in construction and has few component parts; and a traction motor suspension arrangement which allows the use of simpler and more economical axle bearings.

Briefly stated, these and other objects of my invention are achieved in one form thereof by the provision of a first member secured to a truck cross member and providing a closed surface, the provision of a second member secured to the traction motor nose and providing a mating closed surface, and a rubber pad of complementary configuration compressed between the surfaces which are concentrically arranged.

The novel features of the invention are set forth with particularity in the appended claims. The invention itself, however, both as to its organization and method of operation, together with further objects and advantages thereof, may best be understood by referring to the following description taken in connection with the following drawings wherein:

FIGURES 5, 5a and 5b schematically illustrate lateral forces to which a traction motor may be subjected.

Figure 1:
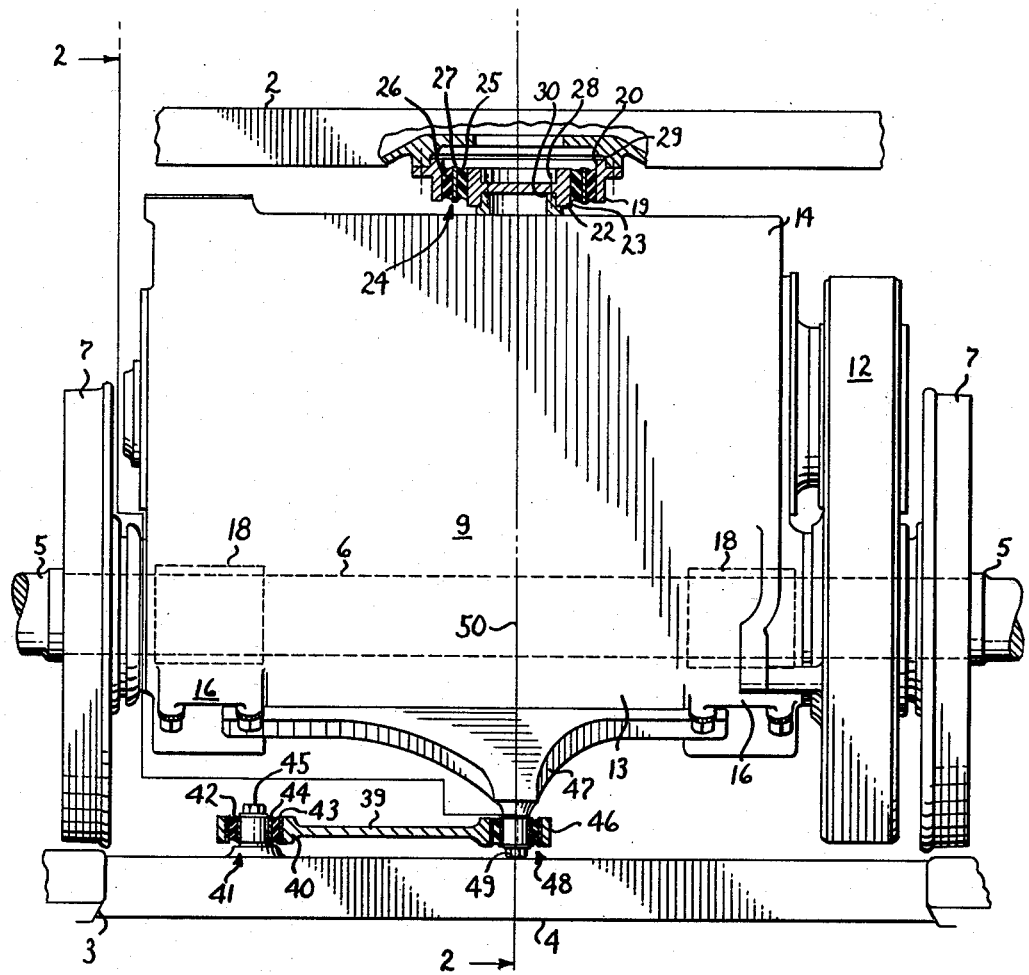
FIGURE 1 is a plan view, partly in section of a traction motor suspended on a railway truck in accordance with my invention.
Figure 2:
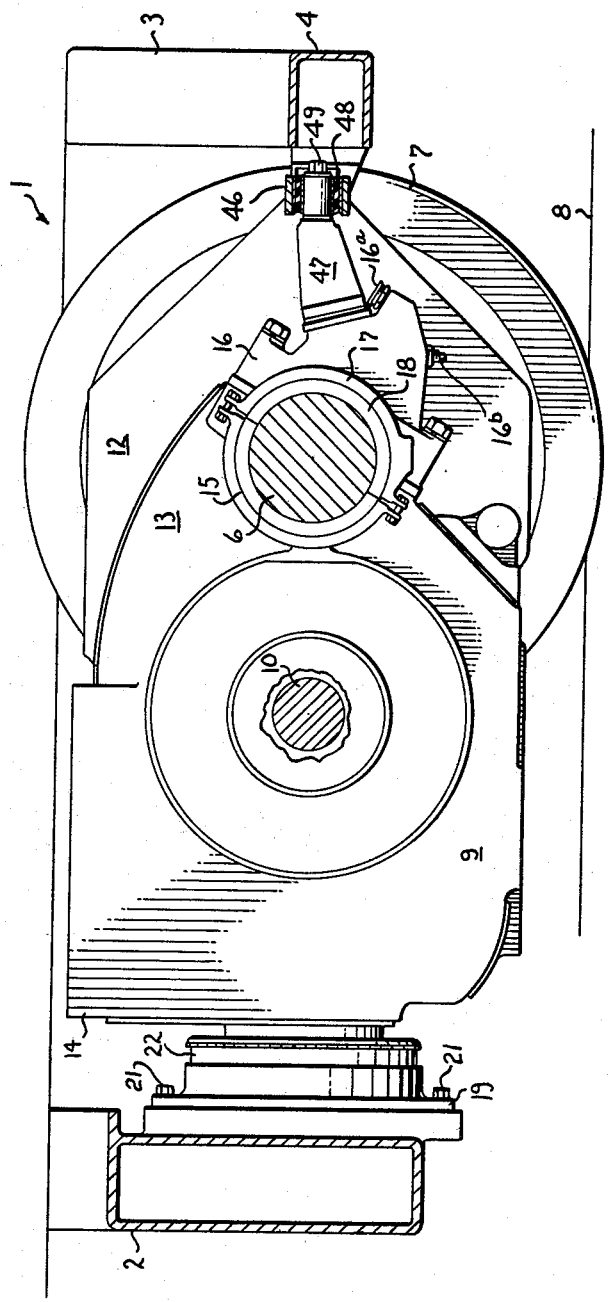
FIGURE 2 is a section taken along line 2—2 of FIGURE 1.

Referring now to the drawings, particularly FIGS. 1 and 2, wherein like numerals identify like elements, I show in part a conventional truck frame 1 which comprises a crosstie 2 which may be a truck transom or bolster and an end tie 3 having a depressed central portion 4. Such a truck frame comprises longitudinal side members, not shown, usually defining pedestal openings therein which fit upon and about journal boxes, not shown, on the journal portions 5 of axles 6. The axles 6 have wheels 7 secured thereon which support the truck assembly and a rail vehicle (not shown) on rail 8. In the drawings I show only one axle, but it is to be understood that in practice the conventional railway truck assembly will have either two or three axles, and traction motors may be drivingly mounted on all of the axles. Mounted on and within truck frame 1 is a traction motor 9 having an armature shaft 10 which, through a pinion (not shown) secured to shaft 10 meshing with a gear (not shown) mounted on axle 6 within gear case 12, driveably engages axle 6. The electrical connections to the traction motor from a power source which may be within a locomotive body supported by the trucks, or which may be from an external source, are not shown. However, such connections are well known to those familiar with the art.

To facilitate illustration of the invention, the traction motor 9 will be described as having an axle end 13 and a nose end 14. The axle end is mounted on and secured about the axle by the provision of semi-annular recesses 15 in the motor frame at the axle end 13, and axle caps 16 having mating semi-annular recesses 17 bolted to the motor frame. Two-part sleeve bearings 18 are included about the axle at the points where the traction motor is mounted thereon. The axle cap 16 contains lubricating means for the bearing 18 which usually comprises an oil reservoir having a wick therein which bears on the axle through a window in the bearing 18. Oil may be added through vent 16a and removed through vent 16b.

Figure 3:
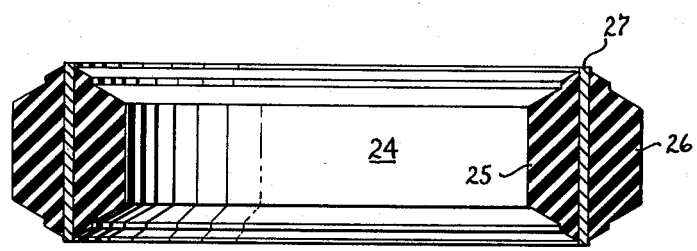
FIGURE 3 illustrates a rubber pad of annular configuration utilized in the invention.
Figure 4:
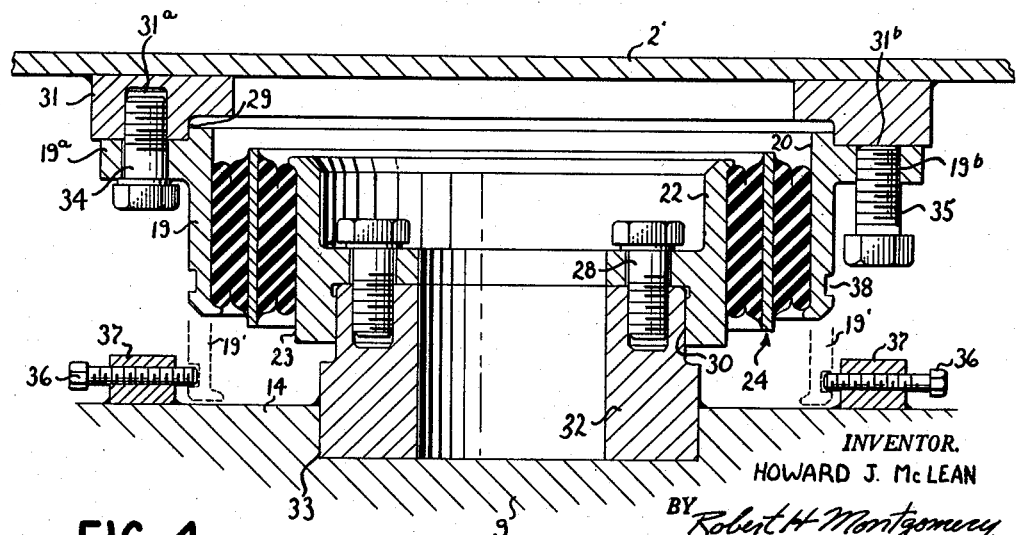
FIGURE 4 illustrates a traction motor nose suspension embodying the invention.

In accordance with my invention, I provide improved means, most clearly seen in FIGS. 1, 3 and 4, for supporting the nose end 14 of the traction motor 9 which, in the illustrations, comprises a truck adapter member 19 having an internal cylindrical peripheral surface 20 removably secured to the crosstie 2 by means of bolts 21 (FIG. 2), a nose support adapter member 22 having an external cylindrical peripheral surface 23 of smaller diameter than the surface 20, and an annular rubber pad 24 in compression between the surfaces. The rubber pad 24 comprises inner and outer rubber pads 25 and 26 which are bonded to an annular metal plate or shim 27. The nose adapter 22 is removably secured to the motor by means of bolts 28. The cross member 2 is arranged to provide a rabbet fit 29 with adapter 19, and the adapter 22 has a rabbet fit 30 with motor extension member 32, most clearly shown in FIG. 4. The rabbet fits are provided for stress and shock-transmitting purposes so that bolts 21 and 28 will not have to carry such loads. It is to be understood that the surfaces 20 and 23 and the rubber pad 24 are not limited to cylindrical definition as illustrated, but may be elliptical or polygonal. Such configurations may be selected or designed to impart predetermined riding characteristics to the motor.

In FIG. 3 I show a diametric section of rubber pad 24 in its uncompressed state. I prefer the two pad-shim construction shown, instead of a single pad in order to achieve greater deflection in the rubber with less stressing thereof, which prolongs the life of the rubber. It may be seen that the pads 25 and 26 are equivalent to two springs in series. Furthermore, inasmuch as rubber itself is essentially incompressible, the construction restrains axial bulging of the rubber in comparison to the bulging that would occur with a single pad of greater thickness than either of the two pads 25 and 26.

The rubber in the pads is selected to be relatively hard in the radial direction and relatively soft in axial and torsional shear. By way of illustration, only to indicate relative values, a pad 24 in one installation embodying the invention is selected to have a spring constant in compression (radially) of 40,000 pounds per inch, an axial shear spring constant of 7,000 pounds per inch, and a torsional or twisting shear spring constant of 220 foot-pounds per degree.

In FIG. 4 I show, in diametric section, a more detailed illustration of the motor nose suspension of FIGS. 1 and 2, and also illustrate how the suspension may be incorporated on existing motorized trucks. In FIG. 4 a truck adapter member 31 is welded to a crosstie 2' and a motor extension member 32 is fitted into a receiving aperture 33 cored in the frame of motor 9 and welded to the frame as shown. The adapter member 19 is then rabbeted 29 into member 31 and bolted thereto by a plurality of bolts 34 threaded through flange portion 19a and into threaded receiving holes 31a in member 31. Additional threaded bolt-receiving holes 19b are provided in flange 19a to receive jack bolts 35.

The jack bolts 35 are utilized to assemble the nose suspension and to disassemble it from the adapter 31. Consider first disassembly. Bolts 34 are removed and jack bolts 35 are threaded into holes 19b, backing member 19 off from the adapter member 31. When member 19 is backed off a sufficient distance, as shown in phantom outline 19', bolts 36 threaded in lugs 37 on the motor nose are moved into engagement with slot 38 or suitable apertures in adapter 19 to hold adapter 19 is the retracted position. In assembling the nose suspension, adapter member 22 is bolted to member 32, the member 19 is pushed back to allow engagement of the bolts 36 with slot 38, the motor which is hung on the axle is jacked or lifted into position to align members 19 and 31. The jack bolts 35 are then turned to engage surface 31b of member 31, the bolts 36 are backed out of slot 38 and bolts 35 are then backed off to position member 19 on and in member 31 to which it is then secured by bolts 34.

Initial assembly of the members 19 and 22 with the rubber pad therebetween may be acomplished in a suitable press. The pad 24 preferably has a suitable lubricant applied and then is pressed over member 22 and member 19 is then pressed over pad 24. In the illustrated structure, the diametric dimensions of surfaces 20 and 23 will determine the precompression of the pad 24. Also, the three members 19, 22 and 24 may be assembled in one pressing operation. The members 19, 22 and 24 may be disassembled in like manner to effect replacement of the pad 24.

Considering the possible forces that may act or react upon the traction motor, it may be seen that there is no rubbing metal to metal contact between the traction motor nose and mounting means on the cross member 2. All relative movement of the traction motor and cross member 2 will be taken in either compression or shear of rubber pad 24, and the rubber pad, upon such relative movement and further compression of the precompressed pad, will assert uniform restoring forces on the traction motor nose, dependent of course upon the magnitude of the force causing relative movement. The precompression of the rubber pad is so chosen that there will be no stress reversals therein to contribute to a long life expectancy.

Some of the advantages of this nose suspension will be best appreciated upon consideration of the forces which may act upon the traction motor. Racking or torsional stresses may be exerted upon the motor to some degree by the wheels meeting rail joints or crossings at different times, but the major racking stresses occur when the rail vehicle tilts and applies its weight to side bearing pads on the longitudinal truck sides. Such tilting may occur on a banked curve or on uneven or crooked track. When such tilting occurs, one side of the truck is depressed on its springs and the axle 6 and crosstie 2 have relative rotation, or one tilts with respect to the other. With the present invention, this tilting action is taken up by torsional shear loading of the annular rubber pad 24. The rubber pad 24 can be by design, and in accordance with one aspect of the invention is made stiff enough in radial compression to exert a substantial restraining force on the traction motor nose to restrain lateral movement thereof and has the required degree of softness in torsional shear to allow the motor to remain with the axle upon relative rotation or tilt of axle 6 and cross-tie 2 and exert little restraint on the nose 13 to thereby eliminate or substantially reduce racking stresses on the motor.

The axle 6 and motor 9 will also be subjected to relative lateral movement. For example, on a curve the axle will tend to move radially from the center of curvature and the motor will tend to slide axially along the axle. Heretofore, flanges (not shown) have been provided on the outboard end of axle bearings 18 to provide a thrust bearing surface between the motor 9 and the gear hub and the motor 9 and the opposite wheel. It is highly desirable to take up at least some of the motor side thrust in the motor nose suspension to relieve the axle bearing side thrust load. These motor thrust loads should be reacted either at the center of gravity of the motor or at points on either side of the center of gravity to minimize or eliminate any bending moment exerted on the axle through the bearings 18. The latter arrangement will avoid twisting of the motor and possible resulting misalignment of the teeth of the pinion and gear.

This may be accomplished by utilizing the lateral thrust-restraining capacity of my motor nose suspension by locating the nose support and axle bearing thrust flanges substantially equidistant from the center of gravity of the motor. However, I prefer to provide an axle thrust-absorbing device to cooperate with the nose suspension in absorbing axle side thrust which may comprise a substantially horizontally disposed rigid link 39 secured at one end 40 to end tie 3 by means of a cylindrical rubber bushing assembly 41 comprising an annular rubber pad 42 between concentric steel shells 43 and 44 and secured to end tie 3 by means of bolt 45. The opposite end 46 of link 39 is secured to a motor frame axle end fin 47 by a rubber bushing assembly 48 which may be identical to bushing 41. The bushing is bolted to end fin 47 by means of bolt 49. This link supplies a desired lateral restraining action on the motor axle end and allows motor tilt. In FIG. 1 I have shown the motor axle end restraint point and nose suspension on a center line 50. While this construction is desirable, it is not considered essential, and the link 39 could be secured between end tie 3 and an axle cap 16. Also the link 39 is pivotally mounted at its ends so as to provide no restraint upon the motor upon relative rotation or tilting of crosstie 2 and axle 6. With the motor lateral restraint now completely truck-mounted rather than axle-mounted, no flanged axle bearings are required and any shock from axle lateral motion must travel through the truck frame and then through rubber cushions to reach the motor frame.

The lateral restraining features of my invention may be more clearly understood by reference to FIGS. 5, 5a and 5b in conjunction with the following discussion. In these figures I show a plan view of a traction motor 51, having its center of gravity located at point 52, hung on an axle indicated by center line 53 by means of sleeve bearings 54 and 55 having side thrust flanges 56 and 57 respectively thereon (FIGS. 5 and 5a only). The nose end of the traction motor is suspended on a truck cross member 58 through a prior art friction type suspension 59 wherein the only lateral restraining force on the nose would be frictional engagement of nose suspension wear plates. Consider now that the truck upon which traction motor 51 is mounted enters a curve, and due to centrifugal force the motor moves laterally outwardly along the axle 53. The force causing the motor to move outwardly is represented by the vector 60 acting at the center of gravity 52. The wheel or gear hub will react on thrust flange 57, as illustrated by vector 61 to oppose movement of the traction motor. Any frictional retarding force in nose suspension 59 is not considered inasmuch as it would be a very small force. It will be seen that the forces represented by vectors 60 and 61 produce a couple which tends to rotate the motor 51 clockwise. To oppose this clockwise rotative couple, a reaction couple comprised of forces represented by the vectors 62 and 63 on axle bearings 54 and 55 respectively will be produced. It will be seen that the forces represented by the vectors 62 and 63 will increase the rate of axle bearing wear and will also tend to produce uneven wear on the bearings. It is to be understood that the vectors 60, 61, 62 and 63 are illustrative only and do not represent in scale the magnitudes of the forces they represent. Reference is now made to FIG. 5a, showing the same motor 51 under the same conditions, but with a nose suspension 65 constructed in accordance with my invention. The force represented by vector 60 is now reacted by the force represented by vector 61' on thrust flange 57, and the nose suspension in accordance with my invention produces a restraining force represented by the vector 66. It will be noted that the reacting forces represented by vectors 66 and 61' are on opposite sides of the center of gravity 52 of the motor at which point vector 60 acts, preferably equidistant thereof. This arrangement embodying the nose suspension of the invention substantially reduces the reactive force on flange 57 and also eliminates or substantially reduces axle bearing wear due to the reactive forces depicted by vectors 62 and 63 shown in FIG. 5.

In FIG. 5b, I have provided a lateral restraining link 67 similar to link 39 of FIG. 1 to secure motor axle cap 18' to truck member 68. The truck member 68 through link 67 provides a reactive force depicted by vector 69 on the traction motor axle end. In this arrangement, no reactive thrust forces except friction on the axle are imposed on axle bearings 54' and 55', and essentially no forces as represented by the vectors 62 and 63 of FIG. 5 are exerted thereon. This arrangement obviates the necessity of flanges on the bearings 54' and 55'. By positioning the points of lateral restraint, i.e., the center line of the nose suspension and the point of attachment of link 67 to the motor on a line passing through the center of gravity 52 of the traction motor 51, I essentially eliminate all reactive forces on the axle bearings transverse to the axis thereof upon lateral thrust of the motor with respect to the axle, or vice versa.

Additionally, my suspension arrangement allows fore and aft movement of the motor with very little restraint thereof with respect to the longitudinal axis of the truck due to motoring and braking loads. Such movement axially loads the pad in shear, where it is relatively soft and such fore and aft movements are taken up by the clearance provided between the truck frame pedestals and journal boxes, sometimes referred to as the axle box guides. As will be apparent, the rubber pad reacts against attempted rotation of the motor about the axle due to motor torque to provide the desired restraint.

With the suspension disclosed, all motion between the motor nose and truck occurs in the rubber pad 24 and the motor nose is always under restraint in the vertical plane due to the high spring constant of the pad in directions in that plane. This eliminates the heretofore use of metal wear plates and resulting wear and replacement thereof. I precompress the rubber pad to magnitude such that loading thereof due to forces exerted on the motor do not cause reversal of stresses in the pad in the direction of compression to enhance the useful life of the pad.

In some instances, it may be desired to provide particular riding characteristics for a traction motor by varying the cross sectional area and/or a radial dimension of the rubber pad 24 (if an annular pad is used). For example, it may be desired to provide less restraint on the traction motor nose in the vertical directions where the pad would react against attempted rotation of the motor about the axle upon which it is mounted. In such case, the geometry of the pad could be so designed to provide a lesser spring constant in the vertical directions than would be desired in the horizontal directions to restrain lateral movement of the traction motor on the axle. Accordingly, it is contemplated that the rubber pad used in the nose suspension may take various geometrical configurations without departing from the scope of this invention.

While I have illustrated and described my invention in a specific form for purposes of disclosure, changes and modifications to the structure disclosed which do not depart from the spirit and scope of the invention may occur to those skilled in the art. Accordingly, it is intended to cover all changes and modifications of the examples of the invention herein chosen for purposes of disclosure which do not constitute departure from the spirit and scope of the invention.

What I claim as new and desire to secure by Letters Patent of the United States is:

1. A motorized railway truck comprising a truck frame having cross members, a wheel and axle assembly adapted to be driven by an axle-hung traction motor journaled on said axle, a motor nose suspension comprising first and second suspension members having annular concentric surfaces, an annular rubber pad compressed between said surfaces, one of said members adapted to be mounted on the traction motor nose and the other of said members being adapted to be mounted on a truck cross member, said rubber pad being compressed between said surfaces to a degree sufficient to prevent stress reversals in said pad due to compressive forces exerted thereon by the motor, a generally horizontal link member having one end pivotally connected to the motor axle end and the other end pivotally connected to an adjacent cross member whereby said nose suspension and said link member cooperate to exert lateral restraining forces against lateral movement of said motor on said axle on opposite ends of said motor, said pad having a twisting shear spring constant such that said pad exerts little restraining force on the motor nose upon relative rotation of the truck member and the axle upon which the motor is hung.

2. In a motorized railway truck including a truck frame having cross members and a wheel and axle assembly adapted to be driven by an axle hung traction motor, a suspension arrangement for said motor comprising:
 (a) first and second motor nose suspension members having annular concentric surfaces, one of said members adapted to be mounted on the nose of said traction motor and the other member adapted to be mounted on a truck cross member so that said annular concentric surfaces are in opposed relationship;
 (b) an annular rubber pad assembly including an outer annular rubber portion, an inner annular rubber portion and an annular metallic shim therebetween bonded to said inner and outer rubber portions, said rubber pad assembly being compressed between the annular concentric surfaces of said motor nose suspension members to a degree sufficient to prevent stress reversals in the rubber pad due to compressive forces exerted thereon by the motor and exhibiting a twisting shear spring constant such that said rubber pad exerts little restraining forces on the motor nose upon relative rotation of the truck member and the axle upon which the motor is hung;
 (c) and a generally horizontal link member having one end pivotally connected to the motor axle end and the other end pivotally connected to an adjacent truck cross member so that said motor nose suspension and said link member cooperate to exert lateral restraining forces on opposite ends of said motor against lateral movement thereof on said axle.

References Cited in the file of this patent

UNITED STATES PATENTS

| | | |
|---|---|---|
| 1,868,818 | Eksergian | July 26, 1932 |
| 1,930,067 | Tibbetts | Oct. 10, 1933 |
| 2,508,139 | Binney | May 16, 1950 |

FOREIGN PATENTS

| | | |
|---|---|---|
| 821,284 | France | Aug. 3, 1937 |
| 246,410 | Switzerland | Dec. 31, 1946 |
| 162,332 | Australia | Apr. 1, 1955 |
| 971,165 | Germany | Dec. 18, 1958 |